US009202104B2

(12) United States Patent
Abe

(10) Patent No.: US 9,202,104 B2
(45) Date of Patent: Dec. 1, 2015

(54) BIOMETRIC INFORMATION CORRECTION APPARATUS, BIOMETRIC INFORMATION CORRECTION METHOD AND COMPUTER-READABLE RECORDING MEDIUM FOR BIOMETRIC INFORMATION CORRECTION

(71) Applicant: FUJITSU LIMITED, Kawasaki-shi, Kanagawa (JP)

(72) Inventor: Narishige Abe, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 39 days.

(21) Appl. No.: 14/067,423

(22) Filed: Oct. 30, 2013

(65) Prior Publication Data
US 2014/0133711 A1 May 15, 2014

(30) Foreign Application Priority Data

Nov. 14, 2012 (JP) .................................. 2012-250317

(51) Int. Cl.
*G06K 9/00* (2006.01)
*G06K 9/40* (2006.01)
*G06K 9/03* (2006.01)

(52) U.S. Cl.
CPC ............ *G06K 9/00067* (2013.01); *G06K 9/036* (2013.01)

(58) Field of Classification Search
None
See application file for complete search history.

(56) References Cited

U.S. PATENT DOCUMENTS

| 8,792,743 B2* | 7/2014 | Komatsu et al. | 382/254 |
|---|---|---|---|
| 2005/0152586 A1* | 7/2005 | Shatford | 382/124 |
| 2008/0310711 A1* | 12/2008 | Jo | 382/167 |
| 2009/0060292 A1* | 3/2009 | Sukegawa | 382/118 |
| 2010/0061649 A1* | 3/2010 | Hou et al. | 382/263 |
| 2012/0250994 A1* | 10/2012 | Shinozaki et al. | 382/167 |
| 2013/0051636 A1* | 2/2013 | Hara et al. | 382/124 |
| 2014/0003682 A1* | 1/2014 | Vieta et al. | 382/124 |

FOREIGN PATENT DOCUMENTS

| JP | 9-62836 | 3/1997 |
|---|---|---|
| JP | 2006-72553 | 3/2006 |
| JP | 2007-202912 | 8/2007 |

(Continued)

OTHER PUBLICATIONS

Marcelo et al., "Reconnection of Fingerprint Ridges Based on Morphological Operators and Multiscale Directional Information" SIBGRAPI '04, pp. 122-129, 2004.

(Continued)

*Primary Examiner* — Randolph I Chu
(74) *Attorney, Agent, or Firm* — Staas & Halsey LLP

(57) ABSTRACT

A biometric information correction method includes applying a correction process with respect to a first biometric image representing biometric information of a user to enhance a degree of clarity of the biometric information of the user, thereby creating a second biometric image, extracting a first feature amount representing features of the biometric information from the first biometric image and a second feature amount representing features of the biometric information from the second biometric image, calculating a degree of change representing a difference between the first feature amount and the second feature amount, and outputting the first feature amount when the degree of change indicates that an artifact has been created in the second biometric image.

11 Claims, 6 Drawing Sheets

(56) References Cited

FOREIGN PATENT DOCUMENTS

| | | |
|---|---|---|
| JP | 2009-42900 | 2/2009 |
| JP | 2011-150483 | 8/2011 |

OTHER PUBLICATIONS

Korean Office Action issued Jan. 16, 2015 in corresponding Korean Patent Application No. 10-2013-0135235.

* cited by examiner 301 302

300

311 312

310

BIOMETRIC INFORMATION CORRECTION APPARATUS, BIOMETRIC INFORMATION CORRECTION METHOD AND COMPUTER-READABLE RECORDING MEDIUM FOR BIOMETRIC INFORMATION CORRECTION

CROSS-REFERENCE TO RELATED APPLICATION

This application is based upon and claims the benefit of priority from the prior Japanese Patent Application No. 2012-250317 filed on Nov. 14, 2012, the entire contents of which are incorporated herein by reference.

FIELD

The present disclosure relates to a biometric information correction apparatus and a biometric information correction method in which biometric information captured on a biometric image is corrected, and a computer program for biometric information correction.

BACKGROUND

A biometric authentication technology determining whether an individual is to be authenticated using biometric information such as a fingerprint or a palm print has been developed recently. The biometric authentication technology is widely used from a large scale system having a large number of registered users such as an entrance-exit management system, a system for controlling boarders, and a system using national identification system to a small scale device used by an individual such as a computer or a portable terminal.

For example, when any one of fingers is used as the biometric information, the biometric authentication apparatus acquires a biometric image representing the fingerprint as an input biometric image. The biometric authentication apparatus then matches the input biometric information which corresponds to a fingerprint of a user represented in the input biometric image with registered biometric information which corresponds to a fingerprint represented in the biometric image of a registered user who has been registered in advance. When it is determined that the input biometric information coincides with the registered biometric information based on a result of the matching process, the biometric authentication apparatus authenticates the user as a registered user who has a valid authority. Also, the biometric authentication apparatus allows the authenticated user to use an apparatus into which the biometric authentication apparatus is inserted or another apparatus connected to the biometric authentication apparatus.

When a sensor reads the biometric information, the quality of the biometric information captured on the biometric image may be degraded due to the surface state of the portion of a living body of a user including the biometric information of the user or due to the movement of the portion at the time of reading the biometric information. For example, when the user presses his or her finger excessively against the sensor, the ridge line may be squashed and the difference in brightness between a pixel corresponding to a ridge line and a pixel corresponding to valley line on the biometric image becomes smaller and thus, the fingerprint becomes unclear. Further, when the surface of the finger is wet or dry, the fingerprint captured on the biometric image may become unclear. As described above, when the biometric image having unclear biometric information is captured is used for a biometric authentication, the biometric authentication apparatus cannot accurately extract the feature amount representing the features of the biometric information. As a result, the authentication accuracy is likely to be degraded.

Therefore, a technique of correcting biometric information captured on a biometric image has been proposed. See, for example, Japanese Laid-Open Patent Publication No. 2006-72553, Japanese Laid-Open Patent Publication No. 2007-202912, Japanese Laid-Open Patent Publication No. 2011-150483 and Japanese Laid-Open Patent Publication No. H09-62836.

Japanese Laid-Open Patent Publication No. 2006-72553 discloses a technique in which input biometric information data is output as it is when correction of the biometric information data is not necessary. However, a predetermined correction process is performed on the input biometric information data to output corrected biometric information data subjected to the correction process when a correction of biometric information data is necessary. Further, in the technique, the quality of the biometric information is evaluated according to a normal evaluation criteria when the biometric information data has not been subjected to the correction process. However, the evaluation criteria is raised to evaluate the quality of the corrected biometric information data when the biometric information data has been subjected to the correction process. Also, when the quality of the biometric information data satisfies the evaluation criteria, a unique feature data extracted from the biometric information data is registered.

Japanese Laid-Open Patent Publication No. 2007-202912 discloses a technique in which the frequency component of which an absolute value of amplitude greater than or equal to a predetermined threshold value is selected, and when the selected frequency component satisfies the quality of a pixel adequate for a matching process, the pixel is reconfigured based on the selected frequency component.

Japanese Laid-Open Patent Publication No. 2011-150483 has proposed a technique in which a gradient image including a fingerprint or a palm print is emphasized based on a ridge line direction distribution data representing the direction distribution of a shape of the ridge line of a fingerprint or a palm print. Further, Japanese Laid-Open Patent Publication No. H09-62836 discloses an image processing method in which a suppressed edge strengthening process or no edge strengthening is performed for an edge region other than the edge region having a degree of edge large than a predetermined threshold value.

SUMMARY

According to an aspect of the present disclosure, there is provided a biometric information correction method including applying a correction process with respect to a first biometric image representing biometric information of a user to enhance a degree of clarity of the biometric information of the user, thereby creating a second biometric image, extracting a first feature amount representing features of the biometric information from the first biometric image and a second feature amount representing features of the biometric information from the second biometric image, calculating a degree of change representing a difference between the first feature amount and the second feature amount, and outputting the first feature amount when the degree of change indicates that an artifact has been created in the second biometric image.

The object and advantages of the invention will be realized and attained by means of the elements and combinations particularly pointed out in the claims. It is to be understood

DESCRIPTION OF EMBODIMENTS

Figure 1:
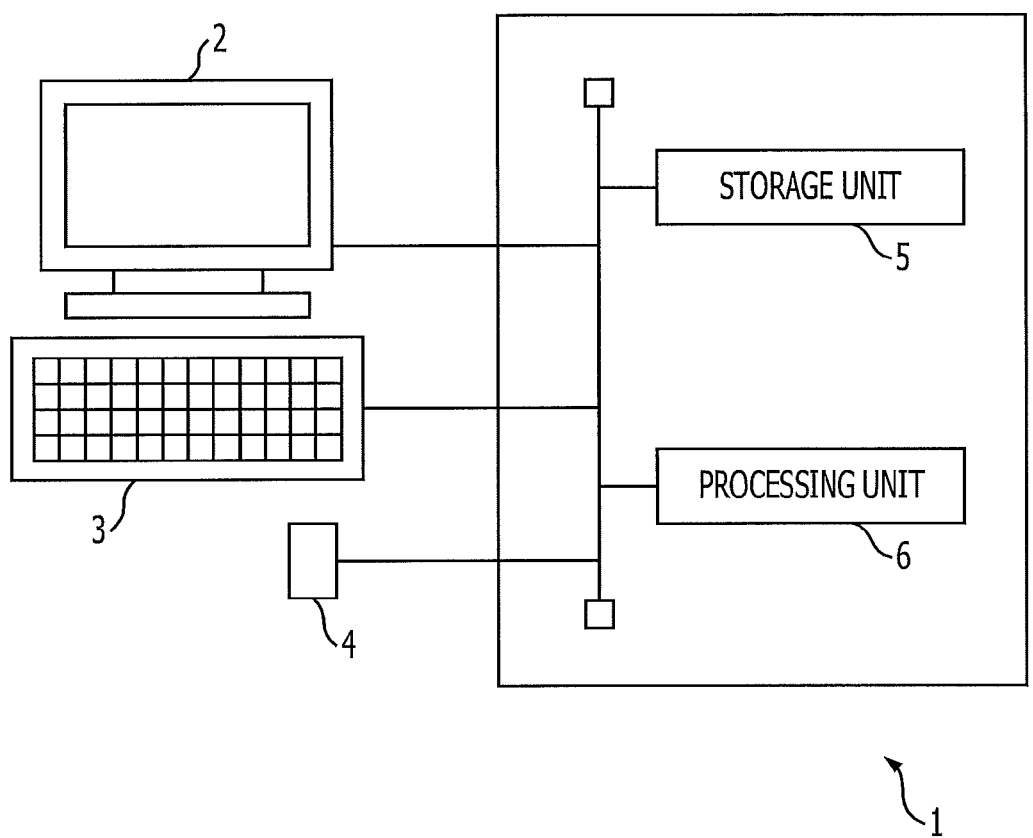
FIG. 1 is a schematic configuration of a biometric authentication apparatus corresponding to a first embodiment of a biometric information correction apparatus.

It is expected that a biometric image is corrected to make clear biometric information that has been captured on the biometric image. In the meantime, the correction of the biometric image is likely to cause an artifact corresponding to a pseudo-characteristic of the biometric information of the biometric image. For example, the biometric image captured with the fingerprint is corrected such that a pseudo-bifurcation point of a ridge line may be created or a point which was the bifurcation point of the ridge line may become an endpoint of the ridge line. Also, when the artifact is created on, for example, the input biometric image or the registered biometric image, a difference between the input biometric information and the registered biometric information becomes larger even if the user is a registered user himself, and thus, the biometric authentication apparatus may fail to authenticate the user. Further, there is a concern that a capability compatibility may be decreased when implementing data for matching which represents features of the biometric information created in a system into another system.

Therefore, one aspect of the present disclosure intends to provide a biometric information correction apparatus in which biometric information is clarified while suppressing the creation of an artifact of the biometric information captured on the biometric image.

According to an embodiment, there is provided a biometric information correction apparatus. The biometric information correction apparatus includes a correction unit configured to apply a correction process which enhances the degree of clarity of biometric information to a first biometric image representing the biometric information of a user to create a second biometric image; a feature amount extraction unit configured to extract a first feature amount representing features of the biometric information from the first biometric image and a second feature amount representing features of the biometric information from the second biometric image; a degree of change calculation unit configured to calculate the degree of change representing the difference between the first feature amount and the second feature amount; and a determination unit configured to output the first feature amount in a case where a value of the degree of change is an estimated value indicating that an artifact of the biometric information is created on the second biometric image.

An object and the advantages of the present disclosure are implemented and achieved by elements particularly specified in claims and combinations thereof. It should be understood that the above-described technique and the technique to be described below in detail are illustrative and explanatory, and do not intends to limit the present disclosure as matters set forth in claims.

Hereinafter, a biometric information correction apparatus according to various embodiments will be described with reference to accompanying drawings. The biometric information correction apparatus extracts feature amount representing features of the biometric information from a biometric image representing the biometric information acquired at the time of registration or matching of the biometric information of a user, and also extracts the feature amount again after performing the correction process with respect to the biometric image. Also, the biometric information correction apparatus evaluates the change of the feature amount at times before and after the correction process to determine whether an artifact is created, and repeats the correction process until it is estimated that the artifact is created or the biometric information becomes clear.

In the present embodiment, the biometric image processing apparatus uses a fingerprint of any one of fingers as a target biometric information for biometric authentication. However, the target biometric information for biometric authentication may be other biometric information which can be represented on the biometric image such as a palm print or a vein pattern of a palm. Further, in the present application, the term "matching process" is used for representing a process in which an index is calculated indicating a degree of difference and a degree of similarity between biometric information of a user and biometric information of the registered user. Further, the term "biometric authentication process" is used for representing the entire authentication process which includes not only the matching process but also the process determining whether the user is to be authenticated using the index obtained by the matching process.

FIG. 1 illustrates a schematic configuration of a biometric authentication apparatus which corresponds to a first embodiment of a biometric information correction apparatus. As illustrated in FIG. 1, the biometric authentication apparatus 1 includes a display unit 2, an input unit 3, a biometric information acquisition unit 4, a storage unit 5, and a processing unit 6. The display unit 2, the input unit 3 and the biometric information acquisition unit 4 may be installed separately from a housing in which the storage unit 5 and the processing unit 6 are accommodated. Alternatively, the display unit 2, the input unit 3, the biometric information acquisition unit 4, the storage unit 5 and the processing unit 6 may be accommodated in a single housing as in a so-called notebook PC or a tablet type terminal. Further, the biometric authentication apparatus 1 may further include a storage medium access device (not illustrated) accessing a storage medium such as a magnetic disk, a semiconductor memory card and an optical storage medium. Also, the biometric authentication apparatus 1 may load and read a computer program for a biometric authentication process stored in the storage medium and executed on the processing unit 6 through, for example, the storage medium access device, and perform the biometric authentication process according to the computer program.

The biometric authentication apparatus 1 matches a fingerprint of a user's finger created by biometric information acquisition unit 4 using the biometric image representing the fingerprint with a fingerprint of a registered user to perform the biometric authentication process. Also, when it is determined that the user is authenticated as any one of the registered users as a result of biometric authentication process, the biometric authentication apparatus 1 allows the user to use an apparatus in which the biometric authentication apparatus 1 is equipped. Alternatively, the biometric authentication apparatus 1 transmits a signal indicating that the user is authenticated to another apparatus (not illustrated) to allow the user to use the another apparatus.

The display unit 2 includes a display device, such as for example, a liquid crystal display. Also, the display unit 2 displays, for example, a message indicating a portion (e.g., any one of fingers) used for matching or a guidance message for placing the portion on a position in which an adequate biometric image can be acquired by the biometric information acquisition unit 4 with respect to the user. Further, the display unit 2 displays a message representing the result of the biometric authentication process performed by the processing unit 6 or various information related to an application.

The input unit 3 includes a user interface, such as for example, a keyboard, a mouse, or a touchpad. Also, a command, data or a user name of the user input through the input unit 3 is transferred to the processing unit 6. However, the input unit 3 may be omitted when the user is not needed to input information other than the biometric information in the biometric authentication apparatus 1.

The biometric information acquisition unit 4 includes a fingerprint sensor using, for example, an area sensor. The fingerprint sensor may be a sensor which adopts, for example, any one of an optical method, an electrostatic method, an electric field method and a heat sensitive method. Also, the biometric information acquisition unit 4 picks up an image of the surface of a user's finger while the user places the finger on a sensor surface of the fingerprint sensor to create the biometric image in which the fingerprint is captured. Further, the biometric information acquisition unit 4 may include a slide type fingerprint sensor. In this case, the biometric information acquisition unit 4 creates sequential partial images at a predetermined time interval while sliding the finger on the fingerprint sensor. A portion of the fingerprint of the surface of the finger is captured in the partial image, and a plurality of the partial images are connected to each other in an image creation time order, so that a biometric image captured with the entire fingerprint of the finger is combined.

The biometric information acquisition unit 4 transfers the created biometric image to the processing unit 6 every time the biometric image is created.

The storage unit 5 includes, for example, a non-volatile semiconductor memory and a volatile semiconductor memory. Also, the storage unit 5 stores, for example, an application program used by the biometric authentication apparatus 1, and the user name, the user identification number, personal setting information of at least one registered user, and various setting information. Further, the storage unit 5 stores a program for performing the biometric authentication process. Further, the storage unit 5 stores the feature amount information including the feature amount of a fingerprint of a specific finger of a registered user corresponding to the registered biometric information of the registered user along with the identification information of the registered user such as a user name or a user identification number of the registered user, for each registered user. The feature amount information includes, for example, a type and position of minutia such as an endpoint or a bifurcation point of a ridge line extracted from the registered biometric image which corresponds to the biometric image representing the registered biometric information. Further, the feature amount information may include other feature amount representing the features of fingerprint such as a local ridge line direction, a shape of the center of the whorl, the position and number of delta. Further, the storage unit 5 may temporarily store the biometric image received from the biometric information acquisition unit 4 and the corrected biometric having been subjected to the correction process.

The processing unit 6 includes one or plural processors and a peripheral circuits thereof. Also, the processing unit 6 corrects the biometric image acquired from the biometric information acquisition unit 4. Further, the processing unit 6 performs a biometric authentication process or a registration process using the corrected biometric image.

Figure 2:
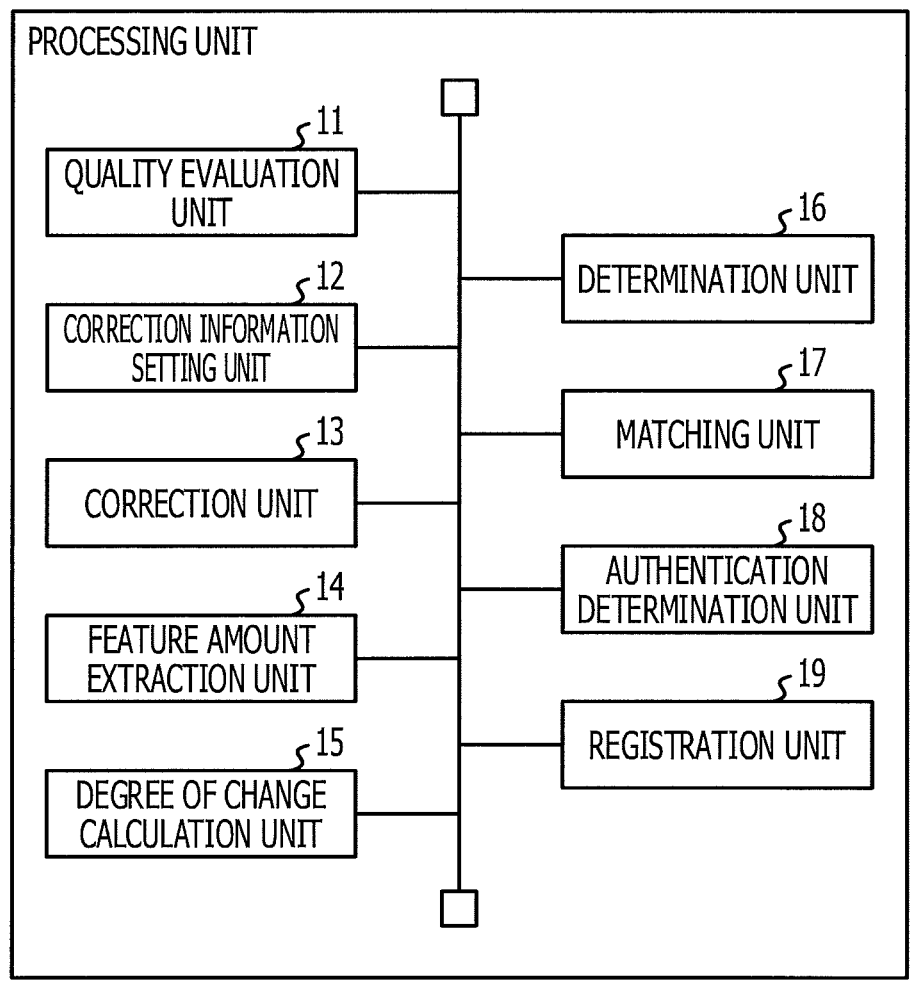
FIG. 2 is a functional block diagram of a processing unit according to the first embodiment.

FIG. 2 is a functional block diagram of the processing unit 6. As illustrated in FIG. 2, the processing unit 6 includes a quality evaluation unit 11, a correction information setting unit 12, a correction unit 13, a feature amount extraction unit 14, a degree of change calculation unit 15, a determination unit 16, a matching unit 17, an authentication determination unit 18 and a registration unit 19. Each of these units included in the processing unit 6 is a functional module provided by the computer program executed on a processor included in the processing unit 6. Alternatively, each of these units included in the processing unit 6 may be installed in the biometric authentication apparatus 1 as firmware.

In the present embodiment, the processing unit 6 determines whether the quality of a biometric image or a corrected biometric image obtained by performing the correction process on the biometric image satisfies a predetermined criteria, and the degree of change of the feature amount due to the performance of the correction process is large enough to estimate that the artifact is occurred. In addition, the processing unit 6 repeats the correction process until the quality of the biometric image or the corrected biometric image satisfies a predetermined criteria or it is estimated that the artifact is occurred.

The quality evaluation unit 11, the correction information setting unit 12, the correction unit 13, the feature amount extraction unit 14, the degree of change calculation unit 15 and the determination unit 16 are used in both the biometric authentication process and the registration process. Further, the matching unit 17 and the authentication determination unit 18 are used in the biometric authentication process. In the meantime, the registration unit 19 is used in the registration process. Accordingly, in the following description, a process performed by each unit common to the biometric authentication process and the registration process will be described first.

The quality evaluation unit 11 calculates a quality value which corresponds to an evaluated value of the quality of the biometric information captured on the biometric image received from the biometric information acquisition unit 4 or the quality of the corrected biometric image. Further, the quality evaluation unit 11 performs the same process for both of the biometric image and the corrected biometric image, and thus, in the following description, details of the quality evaluation unit 11 will be described by calculating the quality value of the biometric image.

The quality evaluation unit 11 divides the biometric image into a plurality of blocks. In the present embodiment, each block has a rectangular shape, and the quality evaluation unit 11 further divides the biometric image into M blocks in a horizontal direction and N blocks in a vertical direction to be arranged in a lattice structure (M and N are integers for two or more) such that a plurality of ridge lines are included in each block. For example, in a case where the biometric information acquisition unit 4 has a resolution of 500 dpi, each block is 24 by 24 pixels or 32 by 32 pixels in size.

The quality evaluation unit 11 calculates the quality value Q(i,j) (i denotes the number of block from a left end of image in a horizontal direction and j denotes the number of block from an upper end of image in a vertical direction) of the biometric image for each block. For example, the quality evaluation unit 11 calculates the quality value Q(i,j) based on an index F(i,j) representing the complexity of a portion of the fingerprint captured on the block. The index F(i,j) may be a value calculated from, for example, the contrast, the peak frequency, or statistics of brightness values such as variance of the brightness value.

The contrast is calculated as, for example, the difference between the maximum value of the brightness value and the minimum value of the brightness value in the block. Further, the peak frequency is obtained as a frequency component having the highest intensity except for a zero-order frequency component, among the respective frequency components obtained from a frequency conversion processing such as the Fourier transform.

Further, the index based on the variance of the brightness value calculated for the block is calculated, for example, in accordance with the following equation.

$$F(i, j) = \frac{1}{1 + \text{Var}(i, j)} \quad (1)$$

Here, Var(i,j) represents the variance of the brightness value calculated relating to the block(i,j). Discrimination between the ridge line and the valley line is unclear in the block in which the fingerprint is unclear, so that the difference between the respective brightness values of the pixels in the block is small. As a result, the variance also becomes small. Accordingly, the value of the index F(i,j) according to the equation (1) becomes large as the variance of the brightness value becomes smaller.

Alternatively, the quality evaluation unit 11 may calculate the index F(i,j) according to the following equation.

$$F(i, j) = \frac{stddev}{mean} \quad (2)$$

Here, "mean" denotes an average value of the brightness values of the pixels in the block(i,j), and "stddev" denotes the standard variance of the brightness value relating to the block (i,j).

Further, the quality evaluation unit 11 may calculate the index F(i,j) of the block based on the texture feature amount, such as for example, entropy or energy of each block. Further, the quality evaluation unit 11 may define the index F(i,j) of the block as a value obtained by combining various statistics such as the contrast, the peak frequency, the variance of the brightness value. However, the value of index F(i,j) may become higher as the shape captured in the block becomes more complex. Accordingly, in this case, the quality evaluation unit 11 normalizes each statistic by dividing each statistics by, for example, the maximum conceivable value and defines the total sum of each normalized statistic as the index F(i,j).

The quality evaluation unit 11 calculates the quality value Q(i,j) for each block according to, for example, the following equation.

$$Q(i, j) = \frac{F(i, j) - F_{min}}{F_{max} - F_{min}} \quad (3)$$

Here, each of Fmax and Fmin denotes the maximum value and the minimum value that can be taken by the feature amount calculated for each block, respectively. As apparent from the equation (3), in the present embodiment, the quality value Q(i,j) of each block denotes the degree of complexity of the block normalized by the difference between the maximum value and the minimum value that can be taken by the feature amount and has a value ranging from 0 (zero) to 1 (one).

Further, the quality evaluation unit 11 may calculate the quality value Q(i,j) only for the block included in an area in which the biometric information is captured on the biometric image or the corrected biometric image. In this case, in the present embodiment, the quality evaluation unit 11 binarizes the brightness value of each pixel of, for example, the biometric image to discriminate a pixel representing a ridge line and a pixel representing a valley line. The threshold value for binarization may be the average value of, for example, the brightness values of the biometric image. Also, the quality evaluation unit 11 determines that a block including a predetermined number or more pixels (e.g., the number of pixels corresponding to one-fourth of a block area) corresponding to the ridge line is included in an area in which the fingerprint is captured.

The quality evaluation unit 11 calculates the average value of the quality value Q(i,j) of each block and transfers the average value to the determination unit 16 as a quality value (Qav) of the biometric information captured on the biometric image or the corrected biometric image.

The correction information setting unit 12 sets the level of correction process performed on the biometric image or the corrected biometric image. The correction unit 13 performs one of the contrast intensifying process, the noise removal process, and the edge strengthening process with respect to, for example, the biometric image or the corrected biometric image according to the set level, and thus, the degree of clarity of the biometric information is enhanced.

For example, it is assumed that the correction unit 13 performs the contrast intensifying process with respect to each pixel of the biometric image or the corrected biometric image according to the following equation (4).

$$q = 255 \times \left(\frac{p}{255}\right)^{\frac{1}{\gamma}} \quad (4)$$

Here, p is the brightness value of the pixel before correction, and q is the brightness value of the pixel after correction. Also, the $\gamma$ is a correction coefficient representing the degree of contrast intensifying. The contrast of the biometric image after correction becomes more intensified as the value of $\gamma$ becomes smaller. In this case, as the level of correction process, the correction information setting unit 12 sets the value of the correction coefficient $\gamma$ to a value with which the biometric information becomes clear as well as the artifact is not created during the correction process performed once, specifically to a positive value less than 1 (one), for example, 0.8.

Further, when the size of an area of the ridge line in which the ridge line is captured is approximately the same as the size of an area of the valley line in which the valley line is captured with respect to the fingerprint captured in the biometric image, the ridge lines adjacent to each other on the biometric image are relatively clearly separated from each other and thus, the artifact of the biometric information is small. Therefore, when the correction unit 13 performs the contrast intensifying process of the equation (4), the correction information setting unit 12 may determine the correction coefficient γ such that the number of the pixels having a brightness value larger than the binarized threshold value which discriminates the ridge line and the valley line becomes approximately the same as the number of the pixels having a brightness value less than or equal to the binarized threshold value.

Further, when the correction unit 13 performs a median filtering process on the biometric image or the corrected biometric image as the noise removal process, the correction information setting unit 12 sets a median filter size to, for example, 3 by 3 pixels or 5 by 5 pixels, as the level of the correction process.

Further, when the correction unit 13 performs a Gabor filtering process with respect to the biometric image or the corrected biometric image as the edge strengthening process, the correction information setting unit 12 sets the number of application of Gabor filtering process during the edge strengthening process performed once to, for example, 2 (two) or 3 (three).

Further, the correction unit 13 may perform an inverse transform after performing Short Term Fourier Transform (STFT) or wavelet transform with respect to the biometric image or the corrected biometric image, and multiplying a specific frequency component by the correction coefficient to intensify the specific frequency component. In this case, the correction information setting unit 12 sets the value of the correction coefficient to be multiplied to the specific frequency component to, for example, about 1.2 to 2.0.

Further, the correction information setting unit 12 may estimate the direction of the ridge line included in each block for each block and make the level of correction process in a direction parallel to the direction of the ridge line different from that in a direction perpendicular to the direction of the ridge line. For example, when applying one-dimensional Gabor filter as the correction process, the correction information setting unit 12 may set the direction of Gabor filter to be perpendicular to the direction of the ridge line. Further, when applying the median filter, the correction information setting unit 12 may set the size of the median filter to a relatively large size, such as for example, 5 pixels, in the direction parallel to the direction of the ridge line and the size of the median filter to a relatively small size, such as for example, 3 pixels, in the direction perpendicular to the direction of the ridge line.

Further, in order to estimate the direction of the ridge line included in the block, for example, the correction information setting unit 12 performs a frequency conversion for each block to check the frequency component in various directions and obtains a direction having the highest frequency component among frequency components corresponding to a gap between the ridge lines. The direction perpendicular to the direction of the ridge line is estimated as the direction having the highest frequency component among frequency components corresponding to a gap between the ridge lines. Therefore, the correction information setting unit 12 defines the direction having a highest frequency component among frequency components corresponding to a gap between the ridge lines as the direction of the ridge line. Further, the correction information setting unit 12 may estimate the direction of the ridge line of each block according to any one of various methods that estimate the direction of the ridge line.

The correction information setting unit 12 notifies the correction unit 13 of the set level of the correction process.

The correction unit 13 performs the correction process such as the contrast intensifying process, the noise removal process, and the edge strengthening process with respect to the biometric image or the corrected biometric image according to the level of correction process notified from the correction information setting unit 12. As described above, when performing, for example, the contrast intensifying process, the correction unit 13 corrects the brightness value of pixel of the biometric image or the corrected biometric image according to the equation (4) using the value of the correction coefficient γ notified from the correction information setting unit 12. Further, when performing, for example, the noise removal process, the correction unit 13 applies the median filter having a filter size notified from the correction information setting unit 12 to the biometric image or the corrected biometric image. Further, when performing, for example, the edge strengthening process, the correction unit 13 repeatedly performs Gabor filtering process with respect to the biometric image or the corrected biometric image by number of times of Gabor filtering process application notified from the correction information setting unit 12.

The correction unit 13 stores the corrected biometric image obtained by performing the correction process in the storage unit 5.

The feature amount extraction unit 14 extracts the feature amount representing the features of the biometric information from the biometric image or the corrected biometric image. In the present embodiment, the feature amount extraction unit 14 obtains, for example, a position of minutia which corresponds to a structure of a characteristic fingerprint such as a bifurcation point and an endpoint of the ridge line of the fingerprint as the feature amount. To this end, the feature amount extraction unit 14 binarizes, for example, the brightness value of each pixel of the biometric image to discriminate a pixel representing the ridge line and a pixel representing the valley line. The threshold value for binarization may be, for example, an average value of the brightness values of the biometric image. Next, the feature amount extraction unit 14 performs a thinning process with respect to the pixels having the brightness value which corresponds to the ridge line with respect to the binarized biometric image to make a line connecting the pixels representing the ridge line to a line having a width of, for example, one pixel thin. Also, the feature amount extraction unit 14 scans the thinned biometric image using a plurality of mask patterns having a binarized pattern corresponding to the bifurcation point or the endpoint of the ridge line to detect a position on the biometric image when the biometric image coincides with any one of the mask patterns. Also, the feature amount extraction unit 14 defines the center pixel of the detected position as the minutia and a type of minutia (e.g., the bifurcation point or the endpoint) represented by the coincided mask pattern as a type of the detected minutia.

Further, the feature amount extraction unit 14 may extract minutia from the biometric image using another known method in which the endpoint or the bifurcation point is obtained as minutia.

The feature amount extraction unit 14 stores the feature amount information including the feature amount such as the total number of the extracted minutia, a type of each minutia and a position on the biometric image in the storage unit 5.

The degree of change calculation unit 15 calculates the degree of change representing the difference between the feature amounts before and after correction by the correction unit 13. In the following description, for the sake of convenience, an original biometric image acquired from the biometric information acquisition unit 4 or the corrected biometric image corrected at a previous time before current by the correction unit 13 is referred to as the biometric image before correction and an image obtained by being undergone the correction process performed by the correction unit 13 is referred to as the biometric image after correction.

Figure 3A:
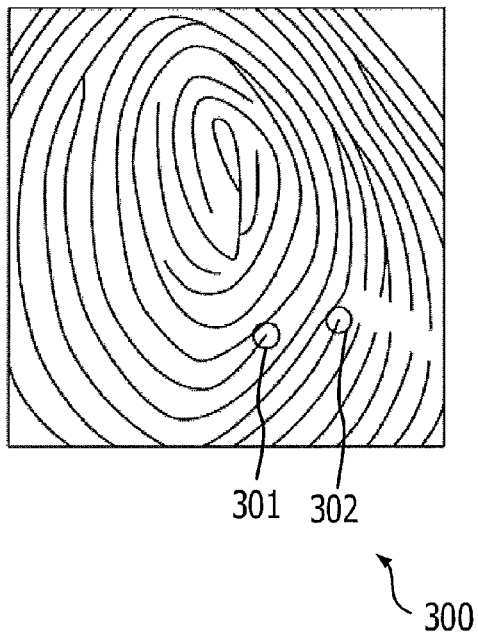
FIG. 3A is a view illustrating an example of a biometric image before correction and FIG. 3B is a view illustrating an example of a biometric image after correction.
Figure 3B:
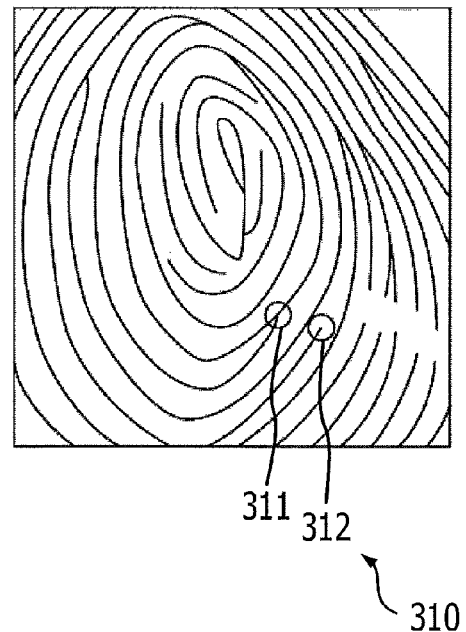

FIG. 3A is a view illustrating an example of the biometric image before correction and FIG. 3B is a view illustrating an example of the biometric image after correction. The endpoint 301 of the fingerprint captured in the biometric image 300 before correction is replaced with the bifurcation point 311 in the biometric image 310 after correction. Further, the endpoint 302 of the fingerprint captured in the biometric image 300 before the correction is moved to the endpoint 312 of an adjacent ridge line which does not have the endpoint before correction in the biometric image 310 after correction. The degree of change calculation unit 15 calculates the degree of change based on the number of a set of minutia, such as the endpoint 301 and the bifurcation point 311, of which the type of minutia is changed before and after correction and positional change of minutia, such as the endpoint 302 and the endpoint 312, before and after correction.

The degree of change calculation unit 15 specifies a nearest minutia among minutiae extracted from the biometric image after correction for each minutia of extracted from the biometric image before correction to obtain a set of corresponding minutiae. Also, the degree of change calculation unit 15 obtains the distance between minutiae for each set of minutiae and calculates an average value MD of the distances.

Further, the degree of change calculation unit 15 calculates the number DN of the sets of minutiae in which the types of minutiae are different from each other among the sets of minutiae. Further, the degree of change calculation unit 15 may add the number of minutia for which other minutiae do not exist within a predetermined distance from the position of the minutia in the biometric image after correction, among the minutiae of the biometric image before correction, to the DN. Further, the predetermined distance is the number of pixels corresponding to a gap between the adjacent ridge lines. Also, the degree of change calculation unit 15 divides the DN by the total number of the sets of minutiae (totalNum) to calculate a ratio DR representing a ratio of changed minutiae types due to the correction process. Also, the degree of change calculation unit 15 calculates the degree of change FVR according to the following equation (5).

$$FVR = MD \times \alpha (1-DR) \qquad (5)$$

Further, $\alpha$ is a predefined constant and is set to about, for example, 0.1 to 0.5. As apparent from the equation (5), the FVR becomes a larger value as the position or the type of minutia is gradually changed due to the performance of the correction process.

The degree of change calculation unit 15 transfers the FVR to the determination unit 16.

The determination unit 16 determines whether the feature amount extracted from the biometric image before correction is output or the feature amount extracted from the biometric image after correction is output based on the Qav and the FVR. Further, the determination unit 16 determines whether the correction process is to be repeated with respect to the biometric image after correction based on the Qav and the FVR.

In the present embodiment, when the Qav of the biometric image received from the biometric information acquisition unit 4 is larger than or equal to a quality determination threshold value (Thqm), the determination unit 16 determines that the correction process is not performed. Also, the determination unit 16 reads the feature amount obtained from the biometric image from the storage unit 5 to output the feature amount to the registration unit 19 or the matching unit 17. Similarly, when the Qav of the biometric image after correction becomes larger than or equal to the Thqm, the determination unit 16 determines that the correction process is not performed any more. Also, the determination unit 16 reads the feature amount information obtained from the biometric image after correction from the storage unit 5 to output the feature amount information to the registration unit 19 or the matching unit 17. Further, the Thqm is set to the lowest value, for example, 0.6, of the quality value at which the biometric image of which Qav is calculated can be considered as an adequate biometric image for use in the biometric authentication process, for example, the lowest value of the quality value at which all of the minutiae captured in the biometric image can be extracted.

Further, when the FVR is larger than the degree of change the threshold value Thvr, the determination unit 16 determines that the artifact is likely to be included in the feature amount extracted from the biometric image after correction. Therefore, the determination unit determines that the correction process is not performed any more. In this case, the determination unit 16 reads the feature amount information obtained from the biometric image before correction from the storage unit 5 to output the feature amount information to the registration unit 19 or the matching unit 17. Further, the Thvr is set to the lowest value of the degree of change which exceeds the gap of the periodic patterns of a motif represented on the biometric image. For example, when the biometric information acquisition unit 4 has a resolution of 500 dpi, the gap between periodic motif patterns of the fingerprint, that is, the gap between the adjacent ridge lines becomes about 8 pixels, the Thvr may be set to a value about 8±2.

In the meantime, when the Qav with respect to the biometric image before correction is lower than the Thqm as well as the FVR is equal to or lower than the Thvr, the determination unit 16 determines that the correction process is to be performed with respect to the biometric image before correction. Also, the determination unit 16 causes the correction unit 13 to perform the correction process with respect to the biometric image before correction.

Figure 4:
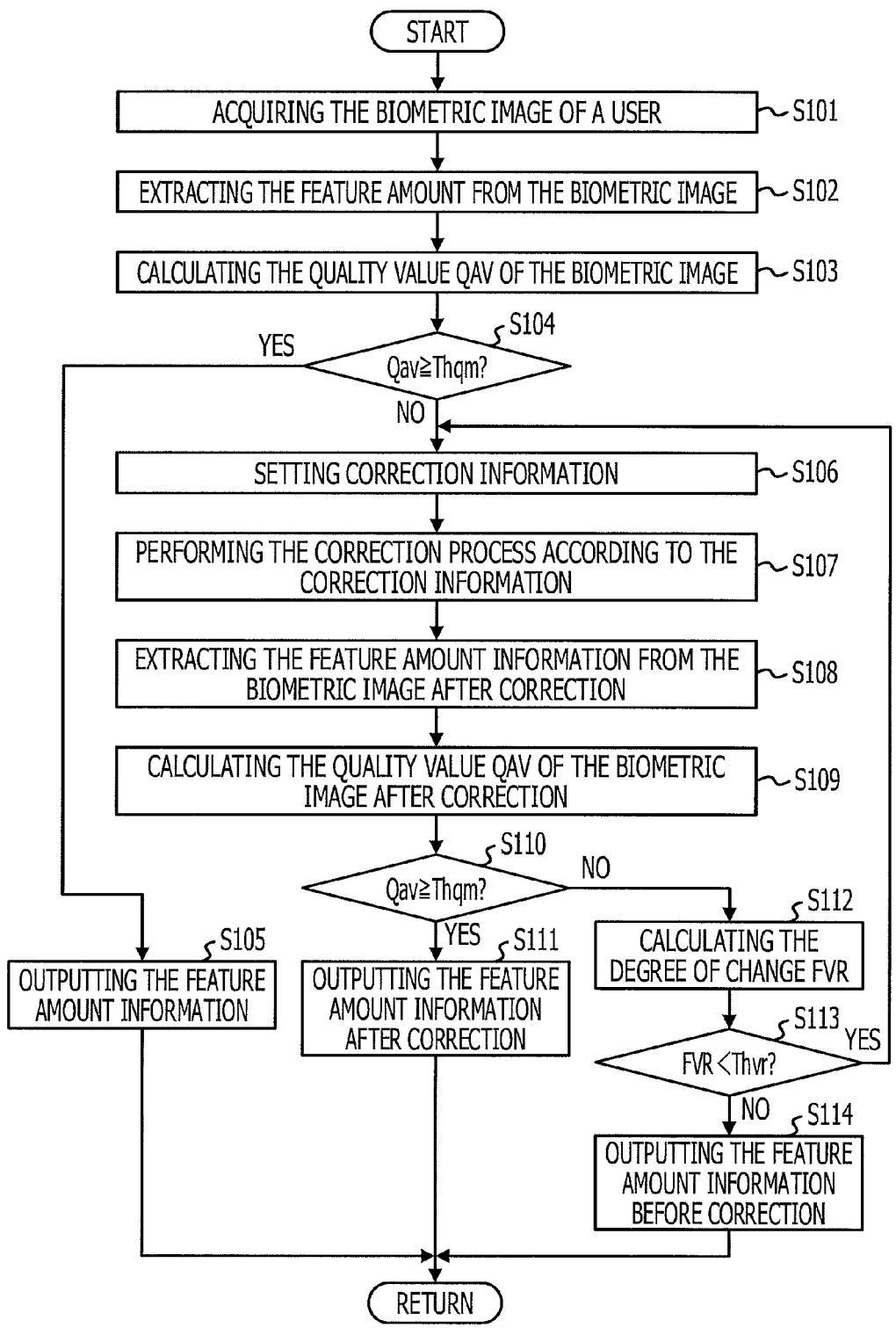
FIG. 4 is a view illustrating an operation flowchart of the biometric information correction process.

FIG. 4 is an operation flowchart of the biometric information correction process performed by the processing unit 6. The processing unit 6 acquires the biometric image in which the fingerprint of a user is captured from the biometric information acquisition unit 4 (step S101). The feature amount extraction unit 14 of the processing unit 6 extracts the feature amount from the biometric image (step S102). Also, the feature amount extraction unit 14 stores the feature amount in the storage unit 5. Further, the quality evaluation unit 11 of the processing unit 6 calculates the Qav of the biometric image (step S103). Also, the quality evaluation unit 11 transfers the Qav to the determination unit 16 of the processing unit 6.

The determination unit 16 determines whether the Qav is greater than or equal to the Thqm (step S104). When it is determined that the Qav is greater than or equal to the Thqm ("YES" at step S104), the determination unit 16 outputs the feature amount information extracted from the original biometric image stored in the storage unit 5 (step S105). Also, the processing unit 6 ends the biometric information correction process.

In the meantime, when it is determined that the Qav is less than the Thqm ("NO" at step S104), the correction information setting unit 12 of the processing unit 6 sets the correction information (step S106). Also, the correction information setting unit 12 notifies the correction unit 13 of the processing unit 6 of the correction information. The correction unit 13 performs the correction process with respect to the biometric image before correction according to the notified correction information to create a biometric image after correction (step S107). Further, since the corrected biometric image has not been created in a first correction process, the original biometric image becomes the biometric image before correction. In the meantime, in the correction processes after a second correction process, the biometric image after correction created by the correction process performed at a previous time becomes the biometric image before correction to be performed at a current correction process. Also, the correction unit 13 updates the biometric image before correction stored in the storage unit 5 with the biometric image after correction.

The feature amount extraction unit 14 extracts the feature amount information from the biometric image after correction (step S108). Also, the feature amount extraction unit 14 associates the feature amount information extracted at the previous time with an old-flag representing that the feature amount information was previously extracted, and at the same time, stores the feature amount information extracted from the biometric image after correction in the storage unit 5. Further, the quality evaluation unit 11 calculates the Qav of the biometric image after correction (step S109). Also, the quality evaluation unit 11 transfers the Qav to the determination unit 16.

The determination unit 16 determines whether the Qav is greater than or equal to the Thqm (step S110). When it is determined that the Qav is greater than or equal to the Thqm ("YES" at step S110), the determination unit 16 outputs the feature amount information extracted from the biometric image after correction stored in the storage unit 5 (step S111). Also, the processing unit 6 ends the biometric information the correction process.

In the meantime, when it is determined that the Qav is less than the Thqm ("NO" at step S110), the degree of change calculation unit 15 of the processing unit 6 calculates the FVR of the feature amount at times before and after correction (step S112). Also, the degree of change calculation unit 15 notifies the determination unit 16 of the FVR.

The determination unit 16 determines whether the FVR is less than the Thvr (step S113). When it is determined that the FVR is less than the Thvr ("YES" at step S113), there is a high possibility that the artifact of the biometric information has not been created in the biometric image after correction. Accordingly, the processing unit 6 performs the processing after step S106 again.

In the meantime, when it is determined that the FVR is greater than or equal to the Thvr ("NO" at step S113), there is a high possibility that the artifact of the biometric information has been created in the biometric image after correction. Accordingly, the determination unit 16 outputs the feature amount information associated with the old-flag, that is, the feature amount information extracted from the biometric image before correction (step S114). Also, the processing unit 6 ends the biometric information correction process.

Biometric Authentication Process

Figure 5:
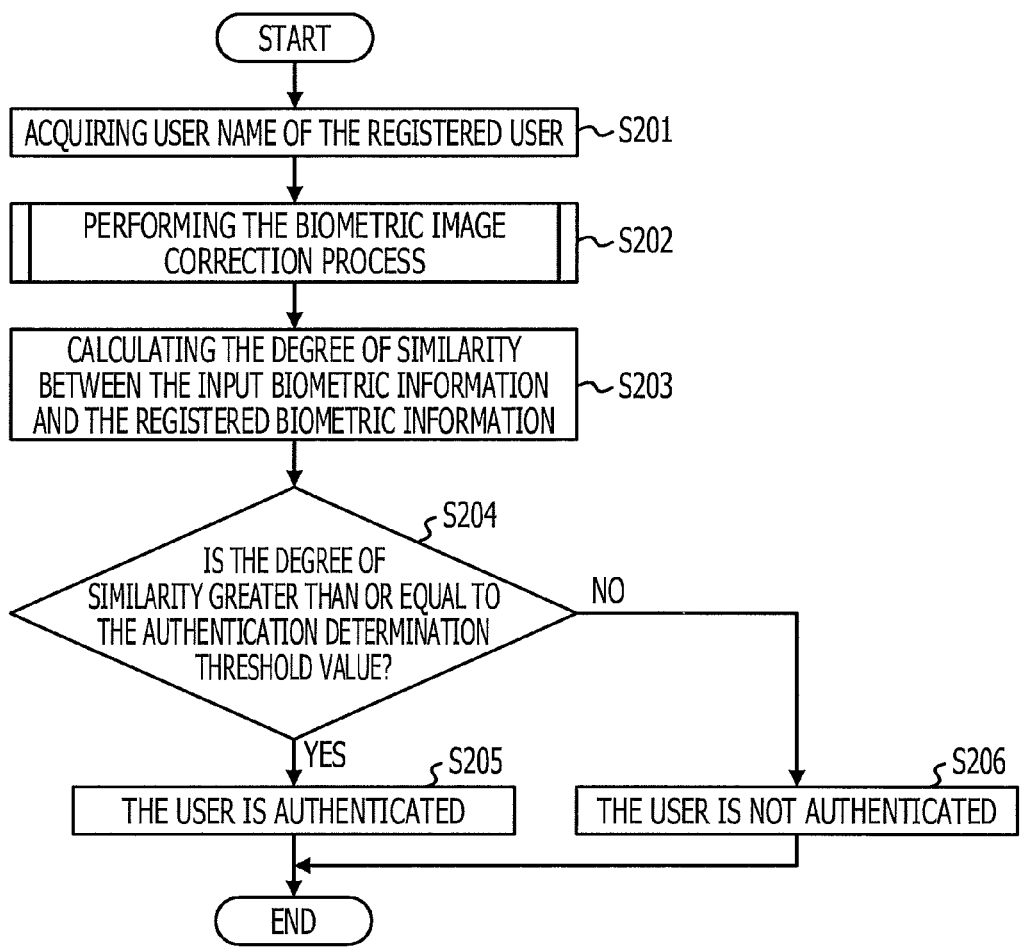
FIG. 5 is a view illustrating an operation flowchart illustrating the biometric authentication process.

FIG. 5 is an operation flowchart of the biometric authentication process performed by the processing unit 6. The processing unit 6 acquires user name or user identification number for specifying a registered user for authentication through the input unit 3 (step S201). Further, the processing unit 6 receives the input biometric image captured with the input biometric information corresponding to the biometric information of the user who intends to be authenticated from the biometric information acquisition unit 4. Also, the processing unit 6 performs the biometric information correction process with respect to the input biometric image to extract the input feature amount information representing the input biometric information of the user captured in the input biometric image (step S202).

The matching unit 17 reads the registered feature amount information representing the features of the registered biometric information of the registered user specified by, for example, the user name input through the input unit 3, from the storage unit 5. Also, the matching unit 17 matches the input feature amount against the registered feature amount to calculate the degree of similarity between the input biometric information and the registered biometric information (step S203).

In the present embodiment, the matching unit 17 calculates the value of the degree of similarity by a minutia matching. In this case, the matching unit 17 performs a positional alignment of a target minutia among, for example, minutiae extracted from the input biometric image with any one of minutiae extracted from the registered biometric image. Also, the matching unit 17 obtains the number of minutiae which coincides with the minutia extracted from the registered biometric image among minutiae extracted from the input biometric image. Further, when the distance between two minutiae is, for example, less than the gap between the ridge lines, the matching unit 17 determines that the two minutiae coincide with each other. Further, only when the types of two minutiae coincide with each other, the matching unit 17 may determine that the two minutiae coincide with each other.

The matching unit 17 obtains the number of minutiae which coincide with each other while changing the set of minutiae. Also, the matching unit 17 defines the ratio of the number of minutiae which coincide with each other to a total number of minutiae extracted from the input biometric image as the degree of similarity.

The matching unit 17 transfers the degree of similarity to the authentication determination unit 18 along with the user name or the user identification number of the registered user.

The authentication determination unit 18 determines whether the degree of similarity is greater than or equal to the authentication determination threshold value (step S204). When it is determined that the degree of similarity is greater than or equal to the authentication determination threshold value ("YES" at step S204), the authentication determination unit 18 determines that the input biometric information of the user and the registered biometric information of the registered user are coincide with each other. Also, the authentication determination unit 18 authenticates the user as the registered user (step S205). When the user is authenticated, the authentication determination unit 18 notifies the processing unit of the authentication result. Also, the processing unit 6 allows the authenticated user to use a device equipped with the biometric authentication apparatus 1 or a device connected to the biometric authentication apparatus 1.

In the meantime, when it is determined that the degree of similarity is less than the authentication determination threshold value ("NO" at step S204), it is determined that the input biometric information of the user does not coincide with the registered biometric information of the registered user. Accordingly, the authentication determination unit 18 does not authenticate the user (step S206). Also, the authentication determination unit 18 notifies the processing unit 6 that the user is not authenticated. In this case, the processing unit 6 does not allow the user who is not authenticated to use the device equipped with the biometric authentication apparatus 1 or a device connected to the biometric authentication apparatus 1. Further, the processing unit 6 may cause the display unit 2 to display a message indicating that the authentication is failed. After performing the step S205 or the step S206, the processing unit 6 ends the biometric authentication process.

Further, the authentication determination threshold value may be set to the same value as a value with which an authentication by the authentication determination unit 18 is successful only when the registered user is the user himself. Also, the authentication determination threshold value may be set to the same value as a value with which an authentication by the authentication determination unit 18 is failed when the user is other person different from the registered user. For example, the authentication determination threshold value may be a value obtained by adding a value obtained by multiplying 0.7 to the difference between the maximum value and the minimum value that can be taken by the degree of similarity to the minimum value of the degree of similarity.

Further, in a case where a one-to-N authentication scheme is employed, that is, the identification information of the registered user such as the user name of the registered user is not input, the matching unit 17 obtains each degree of similarity with respect to each registered user. Also, the matching unit 17 selects the registered user having a maximum degree of similarity. The matching unit 17 transfers the maximum value of the degree of similarity, and the user identification number or the user name of the registered user that correspond to the maximum value and the maximum value, to the authentication determination unit 18. When the maximum value of the degree of similarity is greater than or equal to the authentication determination threshold value, the authentication determination unit 18 authenticates the user as the registered user corresponding to the maximum value of the degree of similarity.

Registration Process

Also, in the registration process, the processing unit 6 receives the biometric image captured with the biometric information of a target user for registration from the biometric information acquisition unit 4. Also, the processing unit 6 performs the biometric information correction process with respect to the biometric image to extract the feature amount information representing the biometric information of the user captured in the biometric image.

The registration unit 19 acquires user name of the target user for registration from the input unit 3. Also, the registration unit 19 sets user identification number which is uniquely set with respect to the user. Also, the registration unit 19 stores the user name and the user identification number of the user in the storage unit 5 along with the feature amount information output from the determination unit 16. Accordingly, the user is registered as the registered user who is allowed to use a device equipped with the biometric authentication apparatus 1.

As described above, the biometric authentication apparatus may check the degree of change of the feature amount at times before and after the correction to estimate whether the artifact of the biometric information is created due to the correction process performed on the biometric image. Accordingly, the biometric authentication apparatus can perform the correction process which enhances the quality of the biometric information with respect to the biometric image within a range where the artifact is not created. Therefore, the biometric authentication apparatus may use the feature amount extracted from the biometric image which enhanced the quality of the biometric information in the biometric authentication while suppressing the possibility of generation of the artifact in the biometric information.

Further, according to another modified embodiment, the correction information setting unit 12 may change the level of correction according to the Qav of the biometric image. For example, the correction information setting unit 12 may make the level of correction higher as the Qav gradually becomes lower. For example, when the correction unit 13 performs the contrast intensifying process of the equation (4), the correction information setting unit 12 may make the correction coefficient γ smaller as the Qav gradually becomes lower. Further, when the correction unit 13 performs the noise removal process using the median filter, the correction information setting unit 12 may make the filter size larger as the Qav gradually becomes lower. Further, when the correction unit 13 performs the edge strengthening process using Gabor filter, the correction information setting unit 12 may increase the number of filter application as the Qav gradually becomes lower.

Further, in this modified embodiment, when the FVR becomes greater than or equal to the Thvr, the correction information setting unit 12 may set the correction information such that the correction level is decreased compared with the correction level in a previous correction process. For example, it can be assumed that the correction process to be applied is the contrast intensifying process of the equation (4) and the correction coefficient γ in the previous the correction process is 0.7. In this case, the correction information setting unit 12 sets the correction coefficient γ to 0.85 in the next correction process. Also, the correction unit 13 performs the correction process with respect to the original biometric image again using the modified correction coefficient γ. Alternatively, it can be assumed that the correction process to be applied is Gabor filtering process and the number of Gabor filter application is 4 (four). In this case, the correction information setting unit 12 may decrease and set the number of Gabor filter application to 2 (two) in the next correction process.

Alternatively, when the FVR becomes greater than or equal to the Thvr, the correction information setting unit 12 may perform a correction process for the original biometric image in the next correction process which is a different type of correction process applied to the previous correction process.

Next, a biometric authentication apparatus according to a second embodiment of the biometric information correction apparatus will be described. The biometric authentication apparatus according to the second embodiment estimates the cause of degradation of the biometric information on the biometric image and changes the type of correction process to be applied to the biometric image according to the estimated cause. The biometric authentication apparatus according to the second embodiment has some different processes among the processes performed by the quality evaluation unit 11, the correction information setting unit 12 and the correction unit 13 of the processing unit, as compared with the biometric authentication apparatus according to the first embodiment. Accordingly, the quality evaluation unit 11, the correction information setting unit 12 and the correction unit 13 will be described in the following description. Details of other components of the biometric authentication apparatus according to the second embodiment refer to the corresponding components of the biometric authentication apparatus.

The quality evaluation unit 11 calculates a divided area ratio indicating a size ratio of an area occupied by the ridge lines and cut on the way by wrinkle or blemish in an object area in which the fingerprint is captured along with the Qav described above at steps S103 and S109 of the biometric information correction process. In order to calculate the divided area ratio, the quality evaluation unit 11 may utilize a method, for example, disclosed by Marcelo et al., "Reconnection of Fingerprint Ridges Based on Morphological Operators and Multiscale Directional Information", SIB-GRAPI '04, pp. 122-129, 2004. For example, the quality evaluation unit 11 detects an area where there is a difference between filtered images obtained by applying a plurality of smoothing filters having different sizes in the direction of the ridge line to the biometric image, respectively, as a divided area. Also, the quality evaluation unit 11 divides the size of the divided area by the size of the object area to calculate the divided area ratio. Further, the object area may be defined as, for example, a set of pixels in which the ridge lines are captured. Also, the biometric image may need to be subjected to a binarization process to detect the pixel captured with the ridge line, as described above. The quality evaluation unit 11 notifies the correction information setting unit 12 of the divided area ratio.

The correction information setting unit 12 estimates the cause of degradation of the biometric information based on the divided area ratio. Accordingly, the correction information setting unit 12 compares the divided area ratio with an area ratio threshold value Thcrack at step S106 of the biometric information correction process. When the divided area ratio is larger than the Thcrack, the fact that there exist many portions where the ridge line is cut on the way is estimated as the cause of the degradation. Therefore, in this case, the correction information setting unit 12 selects, with respect to a portion where the ridge lines on the biometric image are cut on the way, the correction process, for example, Gabor filtering, which works for connecting the ridge line using the direction of the ridge lines located around the portion. In the meantime, when the divided area ratio is less than or equal to the Thcrack, the fact that discrimination between the ridge line and the valley line is unclear is estimated as the cause of the degradation. Therefore, the correction information setting unit 12 selects, for example, the contrast intensifying process described above or unsharp masking process. Further, the Thcrack is set to, for example, about 0.3 to 0.5. The correction information setting unit 12 notifies the correction unit 13 of the correction information indicating the selected type of correction process and the level of correction process. Further, the level of correction process may be set in advance as in the first embodiment, and otherwise, may be changed according to the quality value as in the modified embodiment.

The correction unit 13 refers to the correction information to determine the type of correction process to be applied at step S107. Also, the correction unit 13 applies the determined correction process to the biometric image or the corrected biometric image according to the correction level represented in the correction information.

The biometric authentication apparatus according to the present embodiment may apply an adequate correction process depending on a reason why the biometric information is unclear. Therefore, the biometric authentication apparatus may correct the biometric image more adequately.

Further, in other embodiments, the degree of change calculation unit 15 divides each of the biometric image before correction and the biometric image after correction into a plurality of blocks to calculate the degree of change according to, for example, the equation (5) for each block. Further, each block may have a size including a plurality of characteristic points. In this case, the determination unit 16 may determine whether each block is needed to be subject to the same process as the process according to the embodiment or the modified example to extract the feature amount extracted from the biometric image before correction or to extract the feature amount extracted from the biometric image after correction based on the degree of change of each block. Further, in the modified embodiment, the quality evaluation unit 11 may also calculate the quality value according to the equation (3) for each block calculated with the degree of change. In this case, the determination unit 16 may determine whether the correction process is to be repeated with respect to the biometric image after correction based on the quality value of each block.

Further, the biometric information correction apparatus and the biometric information correction method disclosed in the present application can be applied to various apparatuses or systems which perform the biometric authentication process between the biometric information of the user and the biometric information registered in advance.

Figure 6:
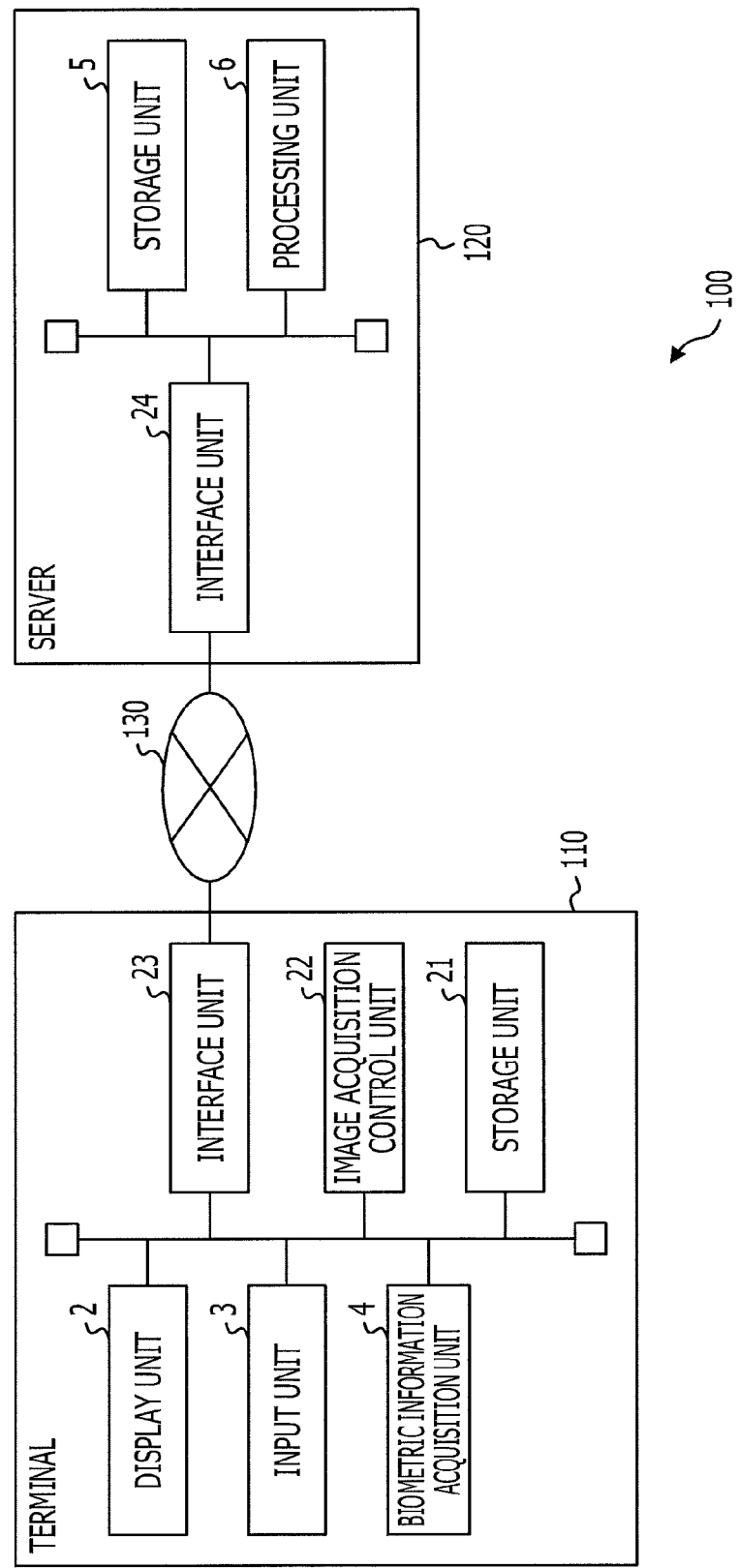
FIG. 6 is a schematic configuration of an exemplary computer system equipped with a biometric information processing apparatus according to each embodiment or a modification thereof.

FIG. 6 is a schematic configuration diagram of a computer system equipped with a biometric information processing apparatus according to each embodiment described above or modification thereto. For example, a computer system 100 includes at least one terminal 110 and a server 120. Also, the terminal 110 and the server 120 are connected with each other through a wired or wireless communication network 130. Further, in FIG. 6, the components corresponding to those included in the biometric authentication apparatus illustrated in FIG. 1 among components included in computer system 100 are assigned the same reference numerals as those included in biometric authentication apparatus.

In the computer system, the terminal 110 is a portable terminal, such as for example, a mobile phone or tablet terminal, or a fixedly installed terminal, and includes the display unit 2, the input unit 3 and the biometric information acquisition unit 4. Further, the terminal 110 includes a storage unit 21, an image acquisition control unit 22, and an interface unit 23. The storage unit 21 includes, for example, a semiconductor memory circuit, and stores temporarily the biometric image created by the biometric information acquisition unit 4. Further, the image acquisition control unit 22 includes one or plural processors and a peripheral circuit thereof and controls each unit of the terminal 110, and further executes various programs run on the terminal 110. Also, the image acquisition control unit 22 transmits the biometric image created by the biometric information acquisition unit 4 to the server 120 through the interface unit 23 which includes an interface circuit for connecting the terminal 110 to the communication network 130. Further, the image acquisition control unit 22 may also transmit the user identification information input through the input unit 3 to the server 120.

The server 120 includes the storage unit 5, the processing unit 6, and an interface unit 24 including an interface circuit for connecting the server 120 to the communication network 130. The processing unit 6 of the server 120 performs the biometric authentication process by implementing functions of each unit included in a processing unit according to any one of the embodiments described above or a modification thereto using the biometric image received through the interface unit 24. Also, the server 120 replies a determination result whether the authentication is successful to the terminal 110 through the interface unit 24.

Alternatively, the image acquisition control unit 22 of the terminal 110 may perform processes performed by the quality evaluation unit, the correction information setting unit, the correction unit, the feature amount extraction unit, the degree of change calculation unit and the determination unit among the functions of the processing units according to each embodiment. In this case, the user identification information and the feature amount information extracted from the biometric image of the user may be transmitted from the terminal 110 to the server 120. In the meantime, the processing unit 6 of the server 120 performs only processes performed by the matching unit, the authentication determination unit and the registration unit among functions of the processing units according to each embodiment. In this way, the processing load of the server 120 is reduced, so that even if a multitude of biometric authentication processes are performed simultaneously, the computer system 100 may suppress the waiting time of users.

Further, the computer program that includes commands which cause the computer to execute the functions of the processing units according to each embodiment may be provided in a form of a recording medium, such as, for example, a magnetic recording medium, an optical recording medium or non-volatile semiconductor memory. The computer program may be recorded in these medium. Further, a carrier wave is not included in a computer-readable recording medium.

The biometric information correction apparatus disclosed in the present application can clarify biometric information captured in the biometric image while suppressing the occurrence of the artifact of the biometric information.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has (have) been described in detail, it should be understood that the various changes, substitutions, and alterations could be made hereto without departing from the spirit and scope of the invention.

What is claimed is:

1. A biometric information correction apparatus comprising:
   a processor configured to
   apply a correction process with respect to a first biometric image representing biometric information of a user to create a second biometric image;
   extract a first feature amount representing features of the biometric information from the first biometric image and a second feature amount representing features of the biometric information from the second biometric image;
   calculate a quality value of the second biometric image and compare the quality value with a quality threshold value;
   when the quality value of the second biometric image is greater than or equal to the quality threshold value, output the second feature amount;
   when the quality value of the second biometric image is less than the quality threshold value, calculate a degree of change representing a difference between the first feature amount and the second feature amount, and compare the degree of change with a degree of change threshold;
   when the degree of change is greater than or equal to the degree of change threshold, output the first feature amount; and
   when the degree of change is less than the degree of change threshold, perform additional correction processing on the second biometric image.

2. The biometric information correction apparatus according to claim 1,
   wherein when the degree of change is less than the degree of change threshold, the processor is configured to
   re-create a new second biometric image by using the second biometric image as the first biometric image based on the quality value,
   extract a third feature amount representing the features of the biometric information from the re-created second biometric image,
   calculate a degree of change between the second feature amount and the third feature amount, and
   determine whether the second feature amount is to be output or the third feature amount is to be output based on the degree of change between the second feature amount and the third feature amount.

3. The biometric information correction apparatus according to claim 1, wherein the processor is configured to
   estimate cause of degradation of the biometric information in the first biometric image and select any one of a plurality of correction processes according to the cause of degradation, and
   apply the selected correction process with respect to the first biometric image.

4. The biometric information correction apparatus according to claim 1, wherein the processor is configured to
   calculate the quality value with respect to the first biometric image, and
   make a level of correction applied to the first the biometric image higher as the quality value gradually becomes lower.

5. The biometric information correction apparatus according to claim 1,
   wherein when the processor determines that the degree of change is greater than or equal to the degree of change threshold, the processor is configured to
   change a type of correction process from the type of correction process in a previous correction process and perform the correction process with respect to the first biometric image again to re-create the second biometric image;
   re-extract the second feature amount from the re-created second biometric image,
   calculate a degree of change between the first feature amount and the re-extracted second feature amount, and
   determine whether the first feature amount is to be output or the re-extracted second feature amount is to be output based on the re-calculated degree of change.

6. The biometric information correction apparatus according to claim 1, further comprising:
   a storage configured to store a registered feature amount which represents features of the biometric information extracted from a registered biometric image on which biometric information of a registered user is captured;
   wherein the processor is configured to
   match the first and second feature amount extracted against the registered feature amount to calculate a degree of similarity between the biometric information of the user and the biometric information of the registered user; and
   determine whether the user is to be authenticated depending on the degree of similarity.

7. The biometric information correction apparatus according to claim 6, wherein the processor is configured to store the first and second feature amount in the storage along with an identification number of the user.

8. The biometric information correction apparatus according to claim 1, wherein the processor is configured to
   divide each of the first biometric image and the second biometric image into a plurality of blocks, and calculate the degree of change between the first feature amount and the second feature amount included in each of the plurality of blocks, respectively, and
   output the first feature amount with respect to each block when the degree of change is greater than or equal to the degree of change threshold in any one of the plurality of blocks of the second biometric image.

9. A biometric information correction method comprising:
applying a correction process with respect to a first biometric image representing biometric information of a user to enhance a degree of clarity of the biometric information of the user, thereby creating a second biometric image;
extracting a first feature amount representing features of the biometric information from the first biometric image and a second feature amount representing features of the biometric information from the second biometric image;
calculating a quality value of the second biometric image and comparing the quality value with a quality threshold value;
when the quality value of the second biometric image is greater than or equal to the quality threshold value, outputting the second feature amount;
when the quality value of the second biometric image is less than the quality threshold value, calculating a degree of change representing a difference between the first feature amount and the second feature amount, and comparing the degree of change with a degree of change threshold;
when the degree of change is greater than or equal to the degree of change threshold, outputting the first feature amount; and
when the degree of change is less than the degree of change threshold, performing additional correction processing on the second biometric image.

10. The biometric information correction method according to claim 9, further comprising:
wherein when the degree of change is less than the degree of change threshold, re-creating a new second biometric image by using the second biometric image as the first biometric image based on the quality value;
extracting a third feature amount representing the features of the biometric information from the re-created second biometric image;
calculating a degree of change between the second feature amount and the third feature amount; and
determining whether the second feature amount is to be output or the third feature amount is to be output based on the degree of change between the second feature amount and the third feature amount.

11. A non-transitory computer-readable recording medium storing a computer program that, when executed, causes a computer to execute a biometric information correction method comprising:
applying a correction process with respect to a first biometric image representing biometric information of a user to enhance a degree of clarity of the biometric information of the user, thereby creating a second biometric image;
extracting a first feature amount representing features of the biometric information from the first biometric image and a second feature amount representing features of the biometric information from the second biometric image;
calculating a quality value of the second biometric image and comparing the quality value with a quality threshold value;
when the quality value of the second biometric image is greater than or equal to the quality threshold value, outputting the second feature amount;
when the quality value of the second biometric image is less than the quality threshold value, calculating a degree of change representing a difference between the first feature amount and the second feature amount, and comparing the degree of change with a degree of change threshold;
when the degree of change is greater than or equal to the degree of change threshold, outputting the first feature amount; and
when the degree of change is less than the degree of change threshold, performing additional correction processing on the second biometric image.

* * * * *